United States Patent [19]

Deccio

[11] Patent Number: 5,195,817
[45] Date of Patent: Mar. 23, 1993

[54] FLASHLIGHT HOLDER APPARATUS

[76] Inventor: Timothy A. Deccio, 10326 Irene Ave. SW, Tacoma, Wash. 98499

[21] Appl. No.: 858,042

[22] Filed: Mar. 26, 1992

[51] Int. Cl.$^5$ .............................................. B62J 6/00
[52] U.S. Cl. ...................................... 362/72; 362/191; 362/396
[58] Field of Search ................. 362/190, 191, 396, 72; 224/32 A

[56] References Cited

U.S. PATENT DOCUMENTS 4,390,927  6/1983  Von Feldt ........................... 362/191
5,008,785  4/1991  Maglica et al. ...................... 362/190

*Primary Examiner*—Carroll B. Dority
*Attorney, Agent, or Firm*—Leon Gilden

[57] ABSTRACT

A holder structure is arranged for mounting to a motorcycle frame above a rear wheel of the motorcycle, with a bracket structure including a plurality of spring-biased C-shaped clamps, each including clamp recesses that are coaxially aligned to mount a flashlight. In a modification of the invention, a second mounting plate arranged in a parallel coextensive relationship relative to the mounting plate is secured thereto to mount within a third and fourth clamp, a magazine tube is receive counter-weight battery members. The organization may further be provided with an illumination indicator member to indicate absence of the flashlight member mounted within the first and second resilient clamps.

2 Claims, 4 Drawing Sheets

FLASHLIGHT HOLDER APPARATUS

BACKGROUND OF THE INVENTION

1. Field of the Invention

The field of invention relates to support apparatus, and more particularly pertains to a new and improved flashlight holder apparatus wherein the same is arranged to conveniently mount a flashlight for access thereto relative to a motorcycle frame.

2. Description of the Prior Art

Motorcycle riders, and frequently police officers and the like, utilize a motorcycle as an official vehicle in performance of duties. The orientation of the flashlight structure must be of ease of access and simultaneously of secure mounting of the flashlight relative to the motorcycle structure. The instant invention attempts to overcome deficiencies of the prior art by providing for mounting structure arranged to provide for convenient access to the associated flashlight. The prior art has utilized various flashlight holder structure and such may be exemplified and found in the U.S. Pat. No. 4,907,769 to Hunley, Jr. et al. wherein a single C-shaped clamp mounts to a tripod structure having magnets thereon.

U.S. Pat. No. 4,897,768 to Thul sets forth a flashlight holder structure mounted to a bracket organization utilizing suction cups for its securement to an underlying surface.

U.S. Pat. No. 4,390,927 to Von Feldt sets forth clamp structure for securing a flashlight relative to a handle bar member of a bicycle member.

As such, it may be appreciated that there continues to be a need for a new and improved flashlight holder apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of flashlight support apparatus now present in the prior art, the present invention provides a flashlight holder apparatus wherein the same is arranged to secure within spaced spring-biased clamps a flashlight assembly. As such, the general purpose of the present invention, which will be described subsequently in greater detail, is to provide a new and improved flashlight holder apparatus which has all the advantages of the prior art flashlight holder apparatus and none of the disadvantages.

To attain this, the present invention provides a holder structure arranged for mounting to a motorcycle frame above a rear wheel of the motorcycle, with a bracket structure including a plurality of spring-biased C-shaped clamps, each including clamp recesses that are coaxially aligned to mount a flashlight. In a modification of the invention, a second mounting plate arranged in a parallel coextensive relationship relative to the mounting plate is secured thereto to mount within a third and fourth clamp, a magazine tube to receive counter-weight battery members. The organization may further be provided with an illumination indicator member to indicate absence of the flashlight member mounted within the first and second resilient clamps.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved flashlight holder apparatus which has all the advantages of the prior art flashlight holder apparatus and none of the disadvantages.

It is another object of the present invention to provide a new and improved flashlight holder apparatus which may be easily and efficiently manufactured and marketed.

It is a further object of the present invention to provide a new and improved flashlight holder apparatus which is of a durable and reliable construction.

An even further object of the present invention is to provide a new and improved flashlight holder apparatus which is susceptible of a low cost of manufacture with regard to both materials and labor, and which accordingly is then susceptible of low prices of sale to the consuming public, thereby making such flashlight holder apparatus economically available to the buying public.

Still yet another object of the present invention is to provide a new and improved flashlight holder apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
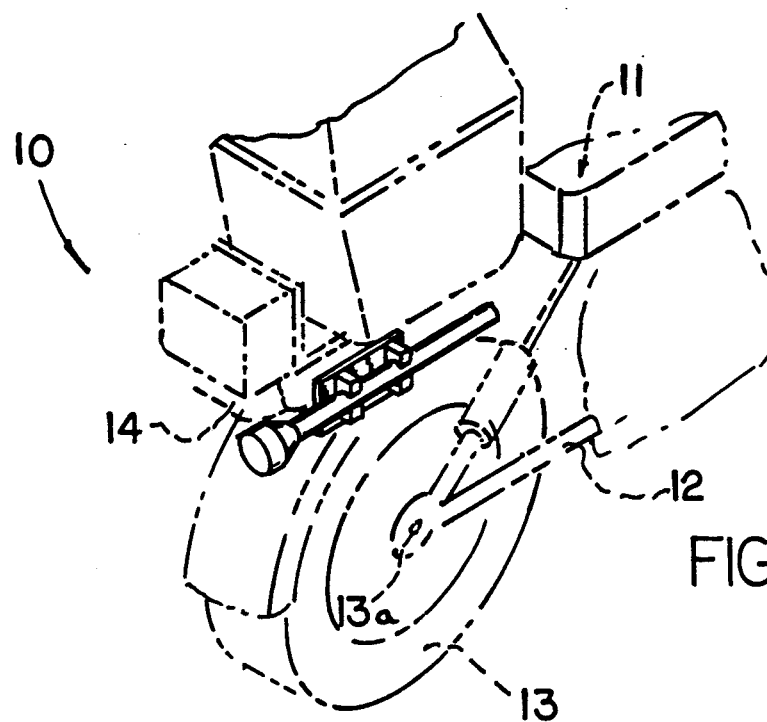
FIG. 1 is an isometric illustration of the instant invention.
Figure 2:
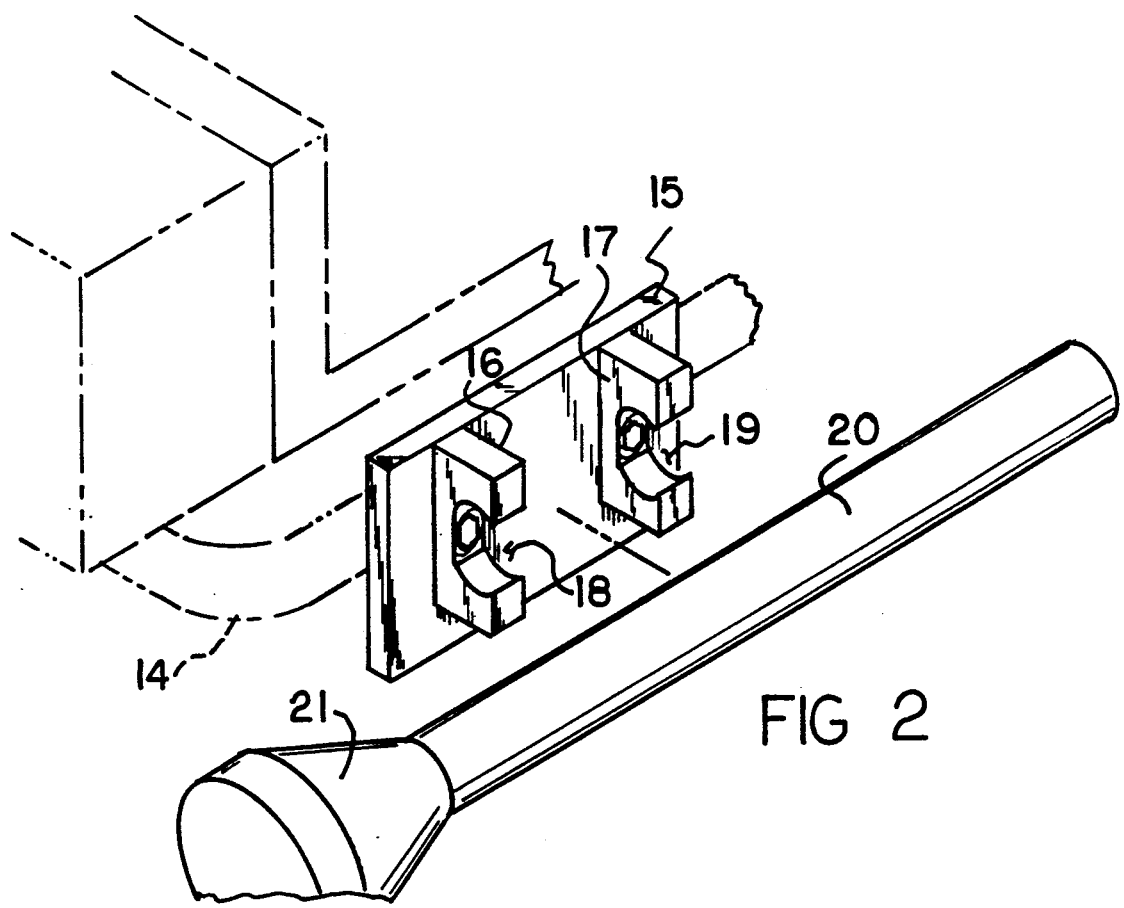
FIG. 2 is an enlarged isometric illustration of the instant invention.
Figure 3:
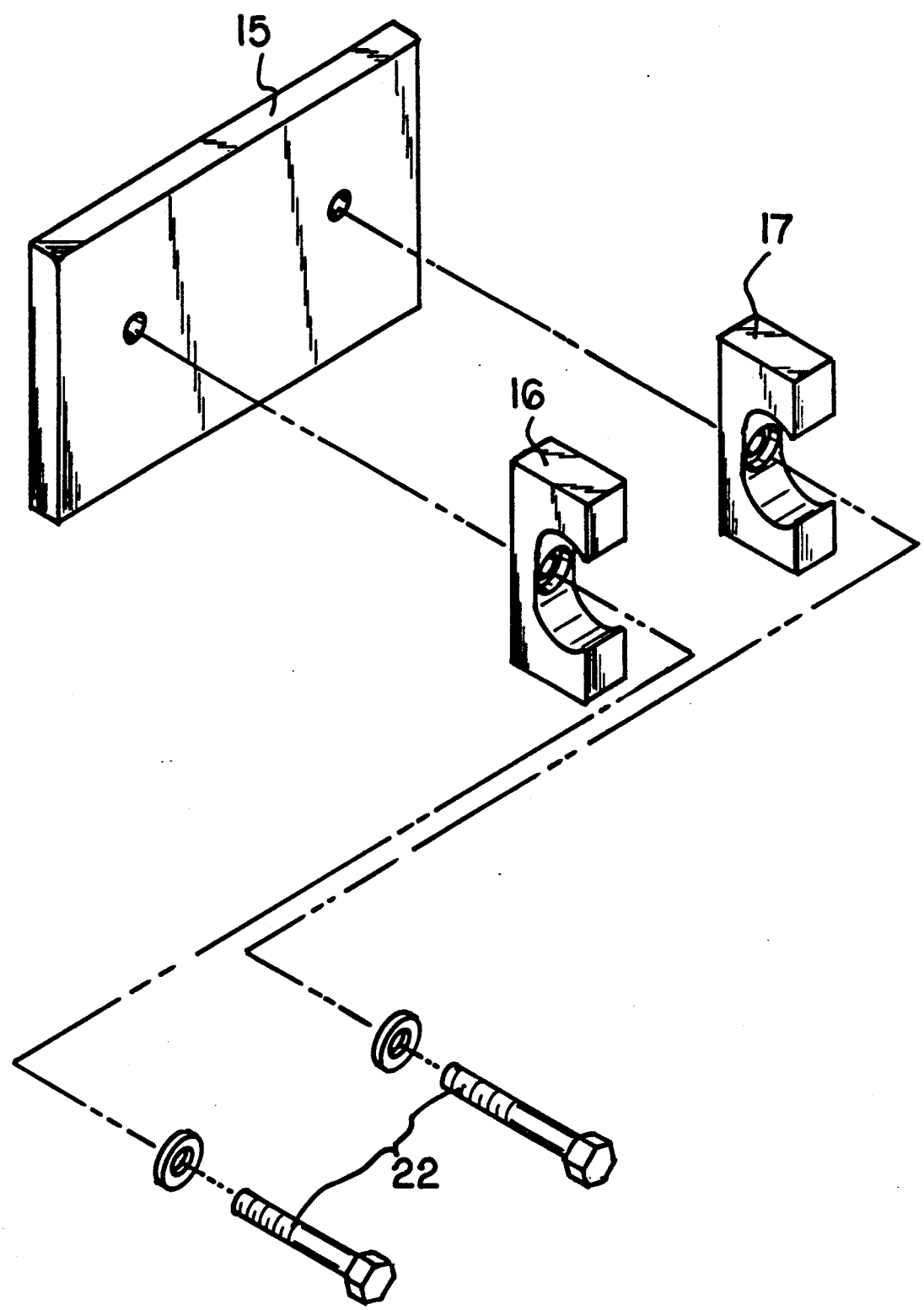
FIG. 3 is an exploded isometric illustration of the instant invention illustrating the various components and their relationship.

With reference now to the drawings, and in particular to FIGS. 1 to 7 thereof, a new and improved flashlight holder apparatus embodying the principles and concepts of the present invention and generally designated by the reference numerals 10, 10a, and 10b will be described.

More specifically, the flashlight holder apparatus 10 of the instant invention essentially comprises the apparatus utilized in association with a motorcycle 11 that is formed with a motorcycle frame assembly 12 rotatably mounting a rear wheel 13 about a rear wheel axle 13a. A support member 14 is mounted to the frame assembly 12 above the rear wheel 13, as illustrated.

A mounting plate 15 is fixedly mounted to the support member 14 in a generally orthogonally oriented manner relative to the axle 13a. Respective first and second C-shaped resilient clamps 16 and 17 including respective first and second clamp recesses 18 and 19 that are coaxially aligned relative to one another receive a cylindrical flashlight housing 20 that in turn is formed with an illumination head 21. Fasteners 22 are provided with a single fastener 22 directed through one of the resilient clamps 16 and 17 orthogonally through the mounting plate 15 into securement to the support member 14 for providing ease of transport of the flashlight housing and associated illumination head thereabout relative to the motorcycle 11.

Figure 4:
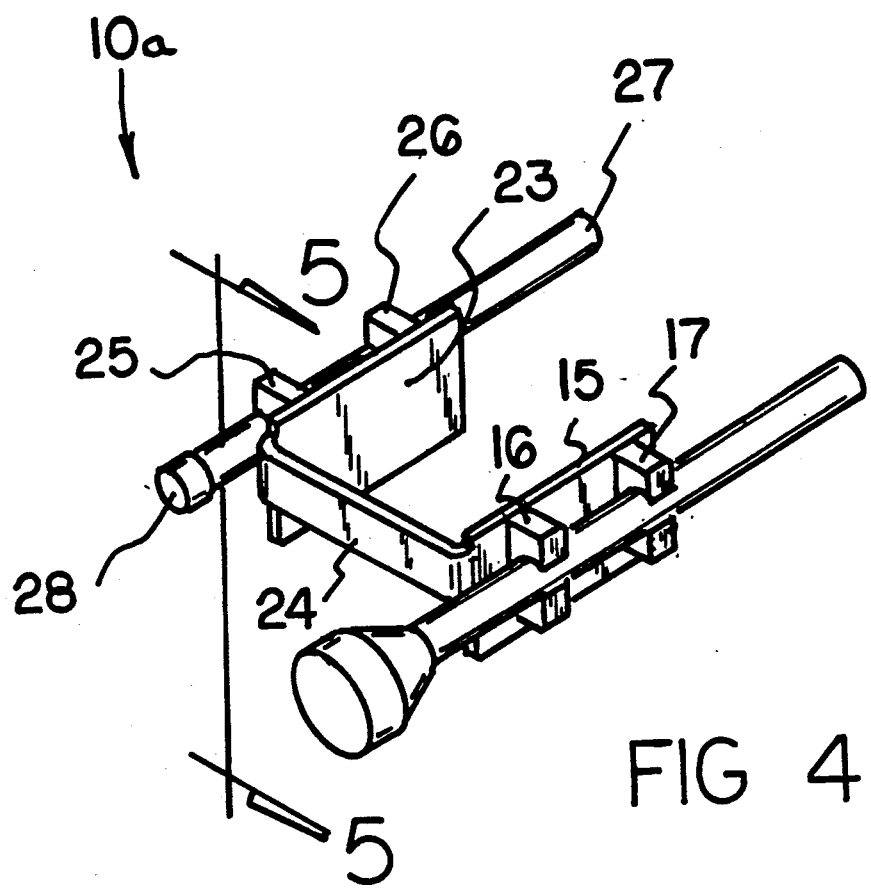
FIG. 4 is an isometric illustration of the modification of the invention.
Figure 5:
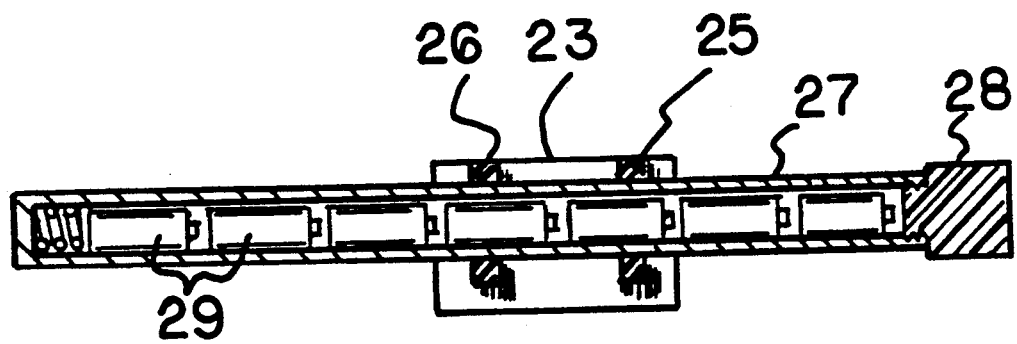
FIG. 5 is an orthographic view, taken along the lines 5—5 of FIG. 4 in the direction indicated by the arrows.

The FIGS. 4 and 5 illustrate a modified apparatus 10a that in addition to the organization 10 of the FIG. 1 includes a second mounting plate 23 arranged in a parallel and coextensive spaced relationship relative to the mounting plate 15, with a junction plate 24 orthogonally directed between a forward distal end of the mounting plate 15 and the second mounting plate 23 to fixedly secure the mounting plate 15 and the second mounting plate 23 in a spaced relationship as described above to receive the support member 14 therebetween. The second mounting plate 23 includes a third and fourth C-shaped resilient clamp 25 and 26 arranged in a spaced relationship, each including a respective third and fourth clamp recess that is coaxially aligned to secure a cylindrical magazine tube 27 having a tube cap 28 removably mounted thereto to receive a plurality of counter-balance battery members 29 in a coaxially aligned relationship within the magazine tube 27. In this manner, counter-balancing of the flashlight member is effected.

Figure 6:
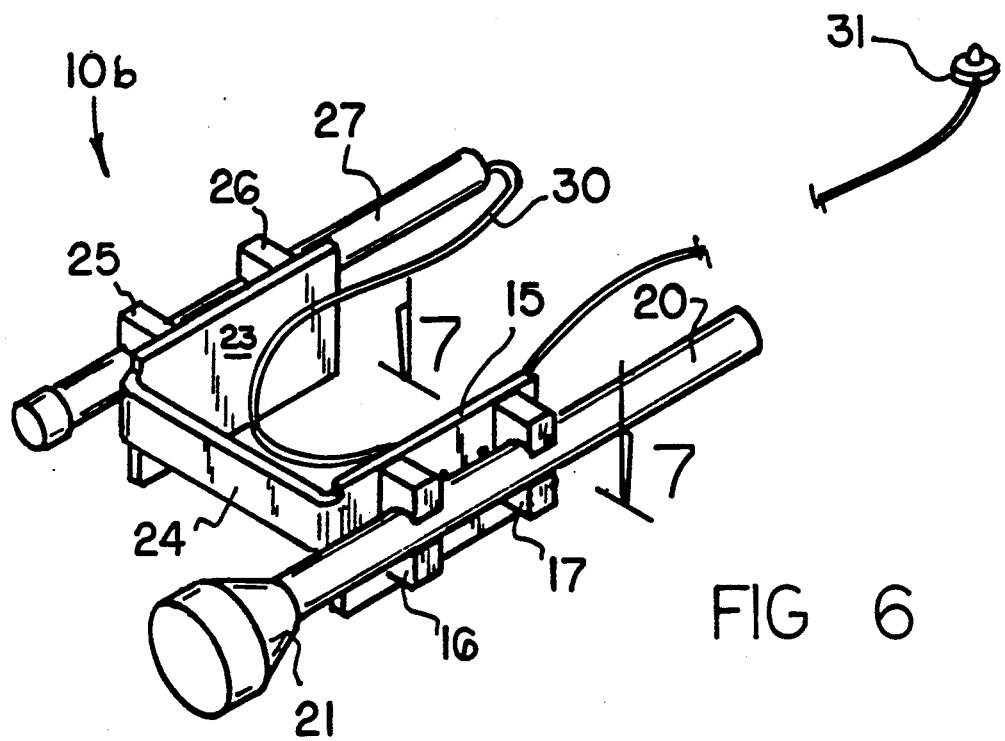
FIG. 6 is an isometric illustration of a further modified aspect of the invention.
Figure 7:
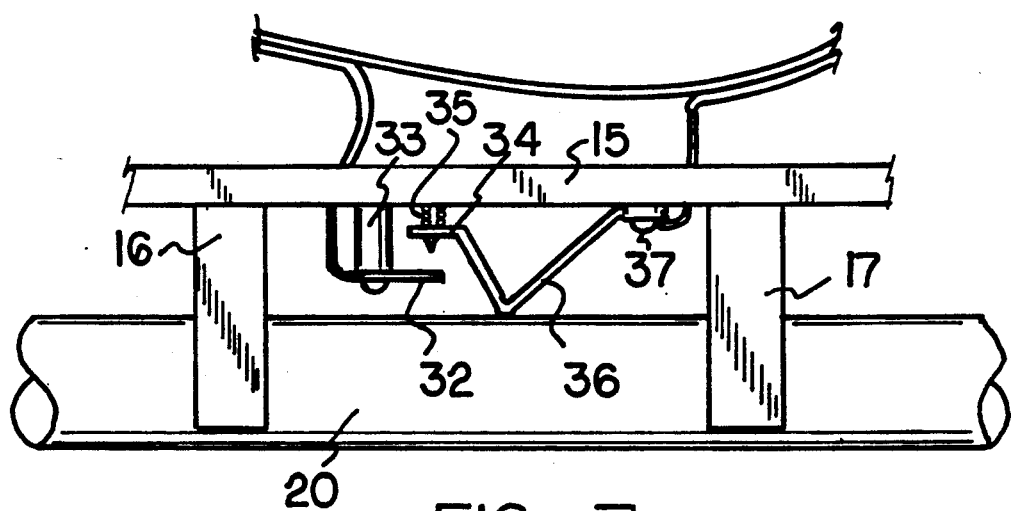
FIG. 7 is an orthographic view, taken along the lines 7—7 of FIG. 6 in the direction indicated by the arrows.

The apparatus 10b, as set forth in the FIGS. 6 and 7, further includes the magazine tube 27 including an electrical conductor cable effecting electrical communication in direct current circuit from the battery members 29 to a signal light 31 mounted forwardly in an orientation on the motorcycle 11, with a switch assembly, as illustrated in FIG. 7, interposed therebetween. The switch assembly includes a first electrical contact flange 32 fixedly mounted to a post 33 that in turn is secured to a forward surface of the mounting plate 15 between the first and second clamps 16 and 17. A second electrical contact flange 34 is spaced between the first contact flange 32 and a mounting plate 15, with a spring 35 interposed between the second flange 32 and the mounting plate 15 to bias the second flange 34 into electrical communication with the first flange 32. A second flange support arm 36 positioned between the first and second resilient clamps 16 and 17 and particularly between the first and second clamp recesses 18 and 19 when biased forwardly by the spring 35 is directed rearwardly to effect spaced displacement of the first flange 32 relative to the second flange 34 to provide for an open switch assembly. Upon removal of the flashlight housing 20, the second flange 34 is directed into communication with the first flange 32 to effect illumination of the signal light 31 by closure of the switch assembly. The support arm 36 is in turn fixedly secured to the forward surface of the mounting plate 15 and from the anchor 37 directed in electrical communication to the signal light 31.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and eguivalents may be resorted to, falling within the scope of the invention.

What is claimed as being new and desired to be protected by Letters Patent of the United States is as follows:

1. A flashlight holder apparatus arranged for securement to a motorcycle, wherein the motorcycle includes a frame assembly and a rear wheel, and an axle rotatably mounting the rear wheel within the frame assembly, and a support member mounted to the frame assembly above the rear wheel, and wherein the apparatus comprises, a mounting plate, the mounting plate fixedly secured to the support member, and the mounting plate including a mounting plate forward surface, with the forward surface including a first C-shaped resilient clamp spaced from a second C-shaped resilient clamp, with the first C-shaped resilient clamp including a first clamp recess, and the second C-shaped resilient clamp including a second clamp recess, wherein the first clamp recess and the second clamp recess are coaxially aligned relative to one another, and a cylindrical flashlight housing mounted to the first C-shaped resilient clamp and the second C-shaped resilient clamp within respective first and second clamp recesses, and a second mounting plate arranged in a parallel coextensive spaced relationship relative to the mounting plate, wherein the second mounting plate and the mounting plate include a mounting plate forward edge and a second plate mounting plate forward edge, and a junction plate mounted to the mounting plate forward edge and the second mounting plate forward edge orthogonally oriented between the mounting plate and the second mounting plate, and the second mounting plate including a second mounting plate forward surface, the second mounting plate forward surface including a third C-shaped resilient clamp and a fourth C-shaped resilient clamp, including respective third and fourth clamp recesses, wherein the third and fourth clamp recesses are coaxially aligned to receive a cylindrical magazine tube therewithin, and the cylindrical magazine tube includes a plurality of counter-balanced battery members contained therewithin.

2. An apparatus as set forth in claim 1 including an electrical conductor cable directed in electrical communication between the battery members and a signal light, and a switch assembly mounted to the mounting plate interposed between the battery members and the signal light, and the switch assembly includes a first electrical contact flange, the first electrical contact flange fixedly secured to a post, the post orthogonally mounted to the forward surface of the mounting plate between the first C-shaped resilient clamp and the second C-shaped resilient clamp, and a second electrical contact flange positioned between the first electrical contact flange and the mounting plate forward surface, and a spring member mounted between the second electrical contact flange and the mounting plate forward surface to bias the second electrical contact flange into electrical communication with the first electrical contact flange, and a support arm fixedly secured to the second electrical contact flange and extending between the first clamp recess and the second clamp recess when the second electrical contact flange and the first electrical contact flange are in electrical communication relative to one another, with the support arm arranged for displacement rearwardly of the first clamp recess and the second clamp recess when the flashlight housing is mounted within the first C-shaped resilient clamp and the second C-shaped resilient clamp.

* * * * *